United States Patent Office 3,202,322
Patented Aug. 24, 1965

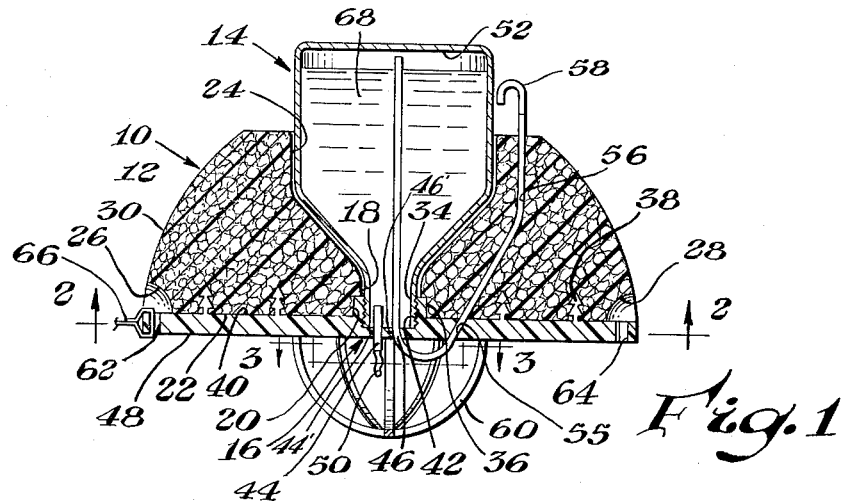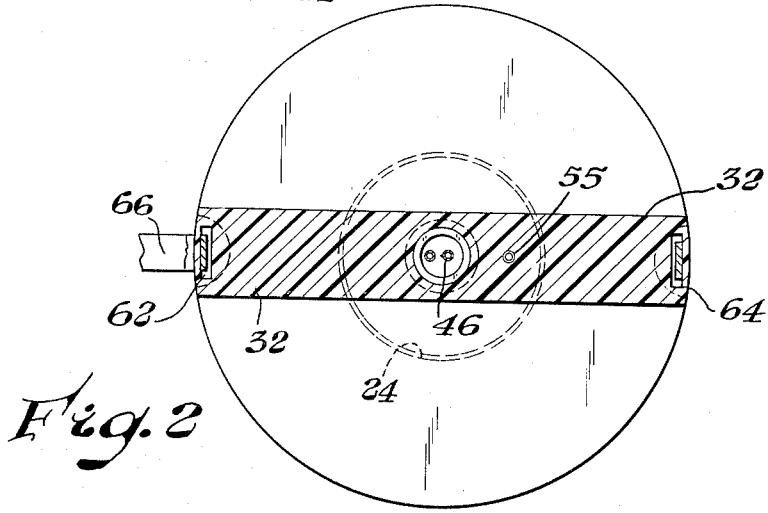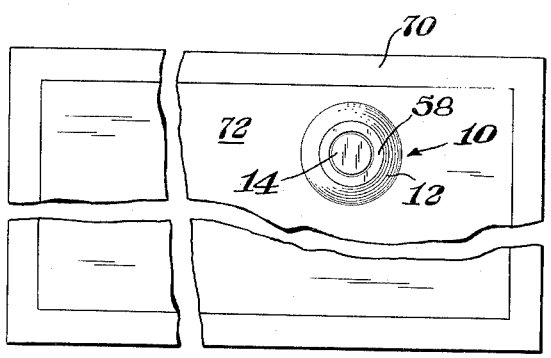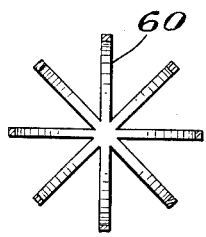
Aug. 24, 1965   R. D. CLEARY ETAL   3,202,322
FLOATING DISPENSING DEVICE
Filed Dec. 2, 1963
INVENTORS.
Robert D. Cleary
James A. Kelly
BY
Earl D. Ayers
AGENT

3,202,322
FLOATING DISPENSING DEVICE
Robert D. Cleary and James A. Kelly, Midland, Mich., assignors to The Dow Chemical Company, Midland, Mich., a corporation of Delaware
Filed Dec. 2, 1963, Ser. No. 327,262
11 Claims. (Cl. 222—173)

This invention relates to dispensing devices and particularly to floating devices for dispensing solutions into a body of liquid under controlled conditions.

In many applications, it is desired to have portable means for dispensing a treating solution into a body of liquid which, when placed in said body of liquid, will float while carrying a container of the solution to be dispensed.

Such devices are useful in dispensing herbicides to kill sub-surface vegetation in streams and lakes, for dispensing chemicals for special purposes such as pH control of a stream or pool of liquid, for dispensing flocculating agents such as alum or polyacrylamide into a pool or stream for dispensing a bactericidal solution into a pool of liquid, for example.

It is important that floating dispensing devices be safe to use and that the device will function properly over a wide range of operating conditions.

Ease in transporting and installation of the devices are also important features which such dispensing devices should have.

Accordingly, a principal object of this invention is to provide an improved floating device for dispensing a solution into a body of liquid.

Another object of this invention is to provide an improved, more reliable floating device for dispensing a solution into a body of liquid.

A further object of this invention is to provide an improved, safer to use floating device for dispensing a solution into a body of liquid.

In accordance with this invention, there is provided a dispensing assembly comprising a flotation section having an axially disposed container receiving part therein, a solution container, and a dispenser head assembly, said head assembly having means thereon for attaching said assembly to the flotation section. Means are also provided as part of the head assembly for venting said container, for metering said solution, and for physically isolating the metering means from direct contact with one handling the device.

The invention, as well as additional objects and advantages thereof, will best be understood when the following detailed description is read in connection with the accompanying drawing, in which:

FIG. 1 is a side elevational view, in section, of apparatus in accordance with this invention;

FIG. 2 is a sectional view taken along the line 2—2 of FIG. 1;

FIG. 3 is a sectional view taken along the line 3—3 of FIG. 1; and

FIG. 4 shows a device of the type shown in FIG. 1 in use in a swimming pool.

Referring to the drawing, and particularly to FIGS. 1, 2 and 3, there is shown a solution dispensing device, indicated generally by the numeral 10. The device comprises three general parts, namely the flotation member 12, the container 14 which holds the liquid to be dispensed, and the dispenser head assembly, indicated generally by the numeral 16.

The flotation member 12 is shaped generally as an oblate hemispheroid having an axial bore 18 extending therethrough. The bore 18 has a counterbored part 20 at the large diameter end 22 of the member 12 and a larger counterbored part 24 at the oblate end which is adapted to receive the container 14. The part 24 is so dimensioned that the container 14 fits loosely but slidably therein. A pair of recesses 26, 28 are provided on diametrically opposite sides of the member 12. The recesses 26, 28 extend from the outer side wall surface 30 to the bottom surface 22. The diameter of the recesses is equal to or less than the width of the plate-like member 32 of the dispenser head assembly.

The flotation member 12 may be made of expanded plastics such as polystyrene, polyethylene, or polyurethane, for example, or of other material of suitable structural buoyancy, rigidity and compatibility with the liquid which it will contact during use.

The dispenser head assembly 16 comprises a generally flat, elongated plate-like member 32 whose length is approximately equal to the diameter of the flotation member 12. The width of the member 32 is greater than the width of the necked closure 34 of the container 14, but usually is a minor fraction of the diameter of the flotation member 12.

The member 32 has a boss 36 which is disposed generally at the intersection of diagonals drawn between the ends of the member 32, the boss being adapted to fit within the counterbored part 20 of the bore 18 when the dispenser head assembly is secured in operable position on the flotation member 12. The member 32 is secured to the bottom of the flotation member 12 by means of the spike-like elements 38 which extend upwardly from the surface 40 of the member 32.

The boss 36 has a threaded bore 42 which extends part way through the boss and plate-like member 32. A pair of smaller diameter bores 44', 46' extend between the bottom of the bore 42 and the lower surface 48 of the member 32.

A pair of tubes 44, 46 extend through the bores 44', 46', respectively. The tube 44, which extends a short distance below the surface 48, has a wick 50 inserted therein and extending therefrom.

The tube 46 extends upwardly almost to the end 52 of the container 14 which is in an inverted position and has its threaded neck part 54 screwed into the threaded bore 42 on the member 32. The tube 46 extends through the bore 55 of member 32 and is curved upwardly, passing through a bore 56 in the flotation member 12 and extending above the flotation member 12. A U-shaped section 58 is provided at the upper end part of the tube 46.

A bowl-shaped framework 60, which may be an integral part of the member 32 or may be separate but attached to the member 32, protects the tube 44, wick 50 and the tube 46 from damage from below the surface of the liquid on which the device floats or while the device is stored before usage. In addition, the framework prevents a swimmer, in event the device is used in a swimming pool, from getting too close to the wick 50, thereby preventing possible irritation of the swimmer's eyes or skin.

The container 14 is a bottle having a wall configuration such that the bottle walls fit, as mentioned previously, closely but slidably against the wall of the counterbored part 24. Usually the container is made of a flexible walled material, but rigid walled containers, those made of glass, for example, may be used.

The slots 62, 64 in the member 32 provide means whereby a mooring line or strap 66 may be attached to the device.

In operation, the device 10 is assembled by attaching the dispenser head assembly 16 to the flotation member 12 and threading the tube 46 through the bore 56 in the flotation member. The head assembly may be attached by pressing the spike-like elements 38 into the flotation member 12 when the parts positioned correctly with respect to each other. The device thus far assembled is then inverted so that the surface 48 faces upwardly and the container 14 having the solution 68 to be dispensed is coupled to the device by screwing the neck of the container into the threaded bore 42 of the member 32.

The completely assembled device is then placed in the liquid into which the solution 68 is to be dispensed. For example, FIG. 4 shows a swimming pool 70 having a dispensing device 10 floating on the surface of the water 72.

The solution 68 passes slowly from the container 14 and into the liquid of the pool or stream through the wick 50. The exact rate of dispensing of the solution may be controlled by controlling the size of the tube 44, the type of wick 50, and the degree of compression of the wick end of the tube 44.

The tube 46 serves to more or less equalize the pressure inside and outside of the container 14, allowing the wick to function to dispense the solution 68.

The comparatively large surface of the wick provides an excellent means for dispensing the solution into the liquid of the stream or pool, thereby avoiding an undue concentration of solution in the liquid at any appreciable distance from the device.

The movement of the device, too, causes the wick to be in motion, further dispersing the solution as it is dispensed.

The container 14 and the flotation member 12 are so dimensioned that the device has a comparatively low center of gravity whereby the device will withstand severe wave action without upsetting. However, in event the device does upset, the device cannot leak solution into the liquid pool or stream at an accelerated rate. In fact, in most situations no solution would be dispensed if the device was upset.

The device 10 may be left to float freely over the surface of a pool or moored to one or more lines or straps 66.

Devices of the above described type are advantageously used in swimming pools, particularly those in which there is a varying demand for bactericidal solution to be dispensed into the water.

Thus, during peak load periods, one or more of these devices may be placed in the pool to supplement the capabilities of the conventional chlorination (or bromination) system of the pool.

The device may also dispense herbicides, algicides, or flocculating agents, for example, depending on the needs of the individual user.

If the individual swimming pool has a built-in chlorination or bromination system, using the device with various containers of solution would assure that it would be used more than during periods where peak chlorination is required. For example, an algicide could be dispensed during off peak use of the pool, or a flocculating agent dispensed at other times.

The assembly is economical to construct, reliable in operation, and is easy to use.

What is claimed is:

1. Apparatus for dispensing a liquid solution into a body of liquid, comprising (a) A flotation member, said flotation member having a solution container receiving section therein;
(b) a hollow container having a closable neck part, said hollow container being disposed in the container receiving section of said flotation member;
(c) a dispenser head assembly including a closure element having a pair of bores extending therethrough, said closure element being coupled to said neck part;
(d) a wick assembly, said wick assembly being coupled to one of the bores in said closure element and extending from said closure element, and
(e) tubular venting means for equalizing pressure within said container, said venting means extending through the other of said bores in said closure element.

2. Apparatus in accordance with claim 1, wherein said flotation element has the shape of an oblate hemispheroid having an axially extending bore extending therethrough, said axially extending bore having a large counterbored part at the oblate end part and a small counterbored part at the opposite end part of the hemispheroid.

3. Apparatus in accordance with claim 1, wherein said closure element is rigidly coupled to a strap-like mounting plate, said mounting plate being rigidly mechanically secured to said flotation member.

4. Apparatus in accordance with claim 2 wherein said container is shaped to fit closely but slidably within said large counterbored part with its neck part extending through the part of said axial bore between the counterbored parts.

5. Apparatus in accordance with claim 3, wherein a hemispherically shaped shielding structure is coupled to said mounting plate on the side thereof which faces away from said flotation member, said shielding structure surrounding the part of the wick part of said wick assembly.

6. Apparatus in accordance with claim 1, wherein said flotation member is made of an expanded plastic material.

7. Apparatus in accordance with claim 1, wherein said flotation member is hollow.

8. Apparatus in accordance with claim 3, wherein said strap-like mounting plate has means thereon for coupling mooring lines.

9. Apparatus in accordance with claim 1, wherein said container has flexible walls.

10. Apparatus in accordance with claim 1, wherein said tubular venting means extends through said flotation member and beyond the oblate part of said hemispheroid.

11. Apparatus in accordance wtih claim 3, wherein said mounting plate is rigidly secured to said flotation member by means of integral spike-like elements which extend from said mounting plate.

References Cited by the Examiner

UNITED STATES PATENTS

| | | | |
|---|---|---|---|
| 2,148,180 | 2/39 | Teigen | 23—267 |
| 2,934,409 | 4/60 | Biehl | 23—267 |
| 2,976,129 | 3/61 | Buehler | 23—267 |

EVERETT W. KIRBY, *Primary Examiner.*